United States Patent
Salowey et al.

(10) Patent No.: US 8,739,245 B2
(45) Date of Patent: May 27, 2014

(54) FLEXIBLE SUPPLICANT ACCESS CONTROL

(75) Inventors: Joseph Salowey, Seattle, WA (US); Hao Zhou, Solon, OH (US); Jason Frazier, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 1122 days.

(21) Appl. No.: 12/319,988

(22) Filed: Jan. 14, 2009

(65) Prior Publication Data

US 2010/0180318 A1  Jul. 15, 2010

(51) Int. Cl.
*H04L 29/06* (2006.01)

(52) U.S. Cl.
CPC ............. H04L 63/105 (2013.01); H04L 63/20 (2013.01)
USPC ................ 726/3; 726/1; 726/2; 726/4; 726/6; 726/11; 726/12; 726/13; 726/14; 726/27; 726/29; 713/154; 713/166

(58) Field of Classification Search
CPC ... H04L 63/105; H04L 63/20; H04L 41/0893; H04L 63/0263; H04L 29/06; H04L 63/0218; H04L 63/0236; H04L 63/04
USPC ............................................................. 726/3
See application file for complete search history.

(56) References Cited

U.S. PATENT DOCUMENTS

| 7,526,792 B2 * | 4/2009 | Ross ................................. 726/2 |
| 2006/0150238 A1 * | 7/2006 | D'Agostino ....................... 726/1 |
| 2006/0209705 A1 | 9/2006 | Sauter et al. |
| 2007/0186275 A1 * | 8/2007 | Shahbazi ........................... 726/2 |
| 2007/0217610 A1 | 9/2007 | Yegani et al. |
| 2008/0034207 A1 | 2/2008 | Cam-Winget et al. |

OTHER PUBLICATIONS

Kirk Beaty et al. "Network-level Access Control Management for the Cloud." IBM T J Watson Research Center, Hawthorne, NY 10532 [2013 IEEE].*

* cited by examiner

*Primary Examiner* — Morshed Mehedi
*Assistant Examiner* — Narciso Victoria
(74) *Attorney, Agent, or Firm* — Hickman Palermo Truong Becker Bingham Wong LLP

(57) ABSTRACT

Systems, methods, and other embodiments associated with flexible supplicant access control are described. One example method includes collecting a network information associated with a network to which an endpoint is to be communicatively coupled. The network information comprises a network identification and information to facilitate the evaluation of network threats. The example method may also include classifying the network based, at least in part, on the network information, to assign a variable level access parameter (VLAP) to the network based on the policy locally configured on the endpoint or centrally managed by the administrator. The VLAP may establish three or more access levels for the network at the endpoint. The example method may also include communicating the network identification and the network VLAP to a second endpoint, a security agent, a security application, and so on.

22 Claims, 6 Drawing Sheets

FLEXIBLE SUPPLICANT ACCESS CONTROL

COPYRIGHT NOTICE

A portion of the disclosure of this patent document contains material that is subject to copyright protection. The copyright owner has no objection to the facsimile reproduction of the patent document or the patent disclosure as it appears in the Patent and Trademark Office patent file or records, but otherwise reserves all copyright rights whatsoever.

BACKGROUND

Supplicants (e.g., endpoints) that attach to a network may be challenged by the network to provide authentication information. A supplicant controls access to a network interface. A network interface has at most one supplicant. One supplicant may service more than one interface. Security components associated with the network evaluate authentication information (e.g., identification and verification information) and determine whether access to network resources is allowed. Additionally, different levels of authorization may be given to supplicants to access different types of data and/or areas of the network. For example, some supplicants may be allowed to view only file names in a network, while other supplicants may be allowed to access and modify files. Similarly, some supplicants may be allowed to access certain parts of a network (e.g., research and development, accounting), while other supplicants may not. In some embodiments, authorization levels (e.g., access levels) may be determined by access control lists (ACLs) that match media access control (MAC) addresses and grant or deny access to certain areas of the network based on the MAC address of the supplicant.

Supplicants may also attempt to authenticate and authorize a network. However, conventional approaches to supplicant authorization operate in a binary manner. These approaches either allow all traffic from the network or deny all traffic from the network. This simple use of binary access levels may cause issues for supplicant entities (e.g., modules). These entities may be forced to close all access to the supplicant by a network due to perceiving a minor security threat or minor issue with the network. This binary closing may prevent the supplicant from accessing network services that could, for example, help the supplicant mitigate and/or eliminate the threat.

Additionally, supplicants in conventional environments do not share information regarding perceived security threats with other applications, control software, and so on. Typical embodiments require all of the applications to individually detect changes in the status of a network (e.g., detect security threats). This may increase security violations and increase network traffic. Security violations may increase because individual applications do not detect the security threat in time, while other supplicants have already perceived the threat. Network overhead may increase due to multiple applications simultaneously and/or continuously communicating on a network in an attempt to detect security issues. Recall that supplicants control access to a network interface while applications access a network through a supplicant. Applications may collect information from a network, may provide information to a network, may communicate with services accessible through a network, and so on. To review, a supplicant provides and controls access to network services. Multiple applications may make use of the supplicants services. Applications may in turn provide services to other applications or to end users. Applications may provide security services such as firewall or threat detection. Conventional supplicants cannot provide granular information about the network. Additionally, conventional applications using the network obtain and maintain their own set information about the network, and this information cannot be shared with other applications.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

BRIEF OVERVIEW

Figure 1:
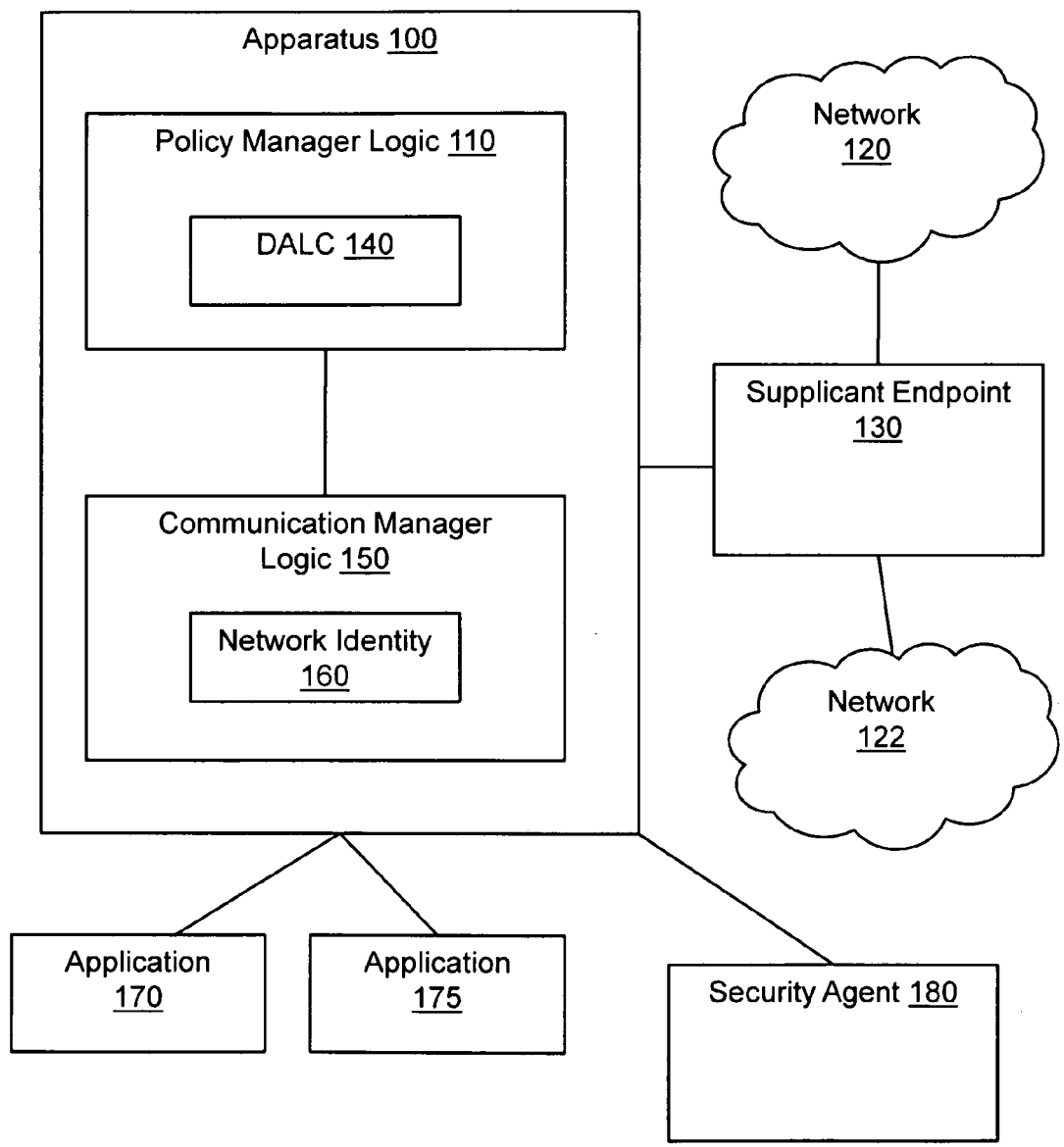
FIG. 1 illustrates an example apparatus associated with supplicant access control.

Traditional embodiments of network security approaches have used differentiated access control to grant network access to clients (e.g., supplicants) to prevent network resources from being viewed or altered. This has typically protected networks from clients but has not addressed protecting clients from networks. However, due to rogue networks that attack supplicants, it may be necessary to control network access to clients using a variable scale access approach similar to differentiated access control (DAC) based approaches used by networks. A rogue network may, for example, pose as a wireless network useable by a laptop computer. Traditionally, simple binary based authentication and authorization procedures have prevented the rogue network and any other non-malicious network from accessing the laptop computer.

Differentiated access control (DAC) may provide multiple levels of access to resources in a computer system and/or in a network. These levels go beyond the simple binary access that allows full access or prevents all access to the resource. The level of access to the resource may be based on analysis of the perceived threat and/or risk posed by the device requesting access. For example, a device may be granted read only access to public files after it authenticates itself (e.g., identification verification) as a non-malicious but unknown device. The classification of the device as non-malicious but unknown may be due to the MAC address of the device not being on an access control list (ACL) as either trusted or malicious. In another example, a security agent may utilize the MAC address and other information about the device requesting access to determine the level of access to be granted. This other information about the device requesting access may include the authenticated identity of the device, usage statistics of the device, information from other security agents about the device, and so on.

Authentication failures and minor security issues may cause a complete denial of access to the network by the supplicant under conventional binary access approaches (e.g., total access or no access approaches). The use of a DAC may facilitate a type of restricted access that allows some access to network resources by a supplicant when the security threats are perceived to be minor. The level of access to networks granted to supplicants may depend on the perceived risk of the network.

In some embodiments, a DAC may facilitate limited access to the network by the supplicant when the network fails to authenticate as a known network but has shown no suspicious and/or malicious behavior. For example, granting limited access to networks having a low perceived threat may allow software applications to determine if the supplicant requires software updates. This may be enabled, for example, by allowing the network to view the file structure of the endpoint (e.g., client). Additionally, the network may be allowed to download an applet or update software that may be verified by the supplicant before the applet or update software is executed. The different levels of access associated with a DAC may be based on the perceived threat level of the network. The perceived threat level of the network may be based, at least in part, on a traffic level of the network, a traffic type of the network, a network protocol level, and so on. Once these criteria are evaluated, the perceived threat level of the network may be computed, and a DAC may be assigned for the network. The DAC may be designed to minimize a threat posed by the network while still providing access for safe operations.

Additionally, the evaluation of network threats to supplicants may be aggregated by centralizing the evaluation process. This may allow the sharing of network threat information between multiple clients and/or supplicants to facilitate a greater awareness of network threats. Also, networks or network authorizations may change. For example, a secure network may be replaced by a rogue network with malicious intent. Therefore, constant evaluation of networks may be required. Aggregation of the evaluation of the perceived threat level of networks may prevent multiple supplicants from having to individually determine the security of networks. This saves bandwidth and processor cycles.

Supplicant access control may include, for example, collecting information from a network to which a supplicant is to be communicatively coupled. The information may facilitate the evaluation of threats from the network. The information may include a network identification, a network traffic level, a protocol level, a network traffic type, and so on. The network may be classified based on the information, which may lead to the assignment of a variable level access parameter (VLAP) to the network. The VLAP may facilitate the granting of multiple levels of access to the network by the supplicant. The VLAP may be communicated to the supplicant, an endpoint, a security agent, a security application, and so on. The supplicant and/or security agent may use the VLAP to determine the type or level of access granted to a network to access the supplicant. Additionally, the VLAP may be used by multiple supplicants and enable the sharing of authentication and authorization information regarding network access to supplicants. A security agent may be an application that collects and sends information to the network. A security agent may also be a security agent layer that provides additional access control to the network above and beyond what a supplicant provides.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

FIG. 1 illustrates an apparatus 100 associated with supplicant access control. In general, apparatus 100 will collect information from a supplicant(s) and other entities that communicate with apparatus 100. These other entities may be, for example, an application, a security agent, and so on. The apparatus will use this information to classify a network. The classification may then be used by different entities to implement detailed differentiated access control policies. The classification may be stored, for example, as a differentiated access level classification 140. Apparatus 100 includes a policy manager logic 110 to classify a network 120 to which a supplicant endpoint 130 is to be communicatively coupled. The policy manager logic 110 may create a differentiated access level classification (DALC) 140 that may classify the network 120. The DALC 140 may facilitate differential access authorization at the supplicant endpoint 130 for the network 120. The classification stored in the DALC 140 may specify three or more levels of access to be granted to the network 120. The policy manager logic 110 may obtain information to classify the network 120 and to create the DALC 140. The information may be obtained through a network access authentication exchange that is associated with an edge device on different types of networks including a Local Area Network (LAN), a Wide Area Network (WAN), a virtual private network (VPN), and so on. The DALC 140 may be based, at least in part, on network information including, a network identification, a network traffic level, a protocol level, a network traffic type, authentication credentials, and so on. The DALC 140 may, for example, grant complete read and write access to the supplicant endpoint 130, allow read access only with no write access to the supplicant endpoint 130, allow read access to limited files on the supplicant endpoint 130, allow access to limited applications on the supplicant endpoint 130, allow viewing of the file structure of the supplicant endpoint 130, bar all access to supplicant endpoint 130, and so on.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

In one embodiment, the policy manager logic 110 is to continuously classify a network 120 to which the supplicant endpoint 130 is communicatively coupled. The policy manager logic 110 is to change the DALC 140 associated with the network 120 when a perceived threat level of the network 120 changes. The DALC may be changed based, at least in part, on a change of status of the network 120, a traffic level of the network 120, a traffic type of the network 120, a protocol level of the network 120, and so on.

In one embodiment, the policy manager logic 110 and the communication manager logic 150 are independent of the supplicant endpoint 130. The policy manager logic 110 is to aggregate the process of continuously classifying networks (e.g., network 120) to which a supplicant endpoint 130 is communicatively coupled. The use of the policy manager logic 110 to aggregate the classification process may prevent the supplicant endpoint 130 from having to individually check the network 120 for perceived security threats. This may lower communication overhead and/or processor overhead by eliminating redundancy. One skilled in the art will realize that checking the network 120 may include obtaining information regarding the network 120 from sources external to network 120.

In one embodiment, the DALC 140 is to differentiate access based, at least in part, on threats and risks associated with the network 120 to which the supplicant endpoint 130 is to be communicatively coupled. In one embodiment, the DALC 140 facilitates establishing classes of service available to the network 120 from the supplicant endpoint 130. The classes of service may correspond to the level of trust assigned to the network 120.

Apparatus 100 may also include a communication manager logic 150 to communicate a network identity 160 and a DALC 140 related to the network identity 160. The communication manager logic 150 may communicate the network identity 160 and the related DALC 140 to a set of applications (e.g., application 170, application 175), a security agent 180, and so on. One skilled in the art will realize that the apparatus 100 may be embodied in the supplicant endpoint 130. In this example, the communication by the apparatus 100 with the multiple applications and/or security agents may facilitate the sharing of authentication and authorization information. Thus, multiple applications that make use of the supplicant 130 to access the network 120 can share information through apparatus 100. Additionally, one skilled in the art will realize that apparatus 100 may be independent of the supplicant endpoint 130. Apparatus 100 may sit between supplicant endpoints and other clients in, for example, an 802.1X port based network access control environment. Apparatus 100 may be a centralized communication manager (CCM) that facilitates the granting of different access levels to supplicants by different networks by evaluating networks.

In one embodiment, the communication manager logic 150 is to communicate updates of the DALC 140 to applications, the security agent 180, and so on. Note that supplicant endpoint 130 may provide access to a set of networks (e.g., network 120, network 122).

In different embodiments, the security agent 180 may be a local firewall, an external firewall, a security application, an authentication server, and so on. One skilled in the art will realize that security agent 180 may include its own independent policy managers and communication managers that check the network 120 and/or network 122 with which the security agent 180 may be associated. In this example, the policy manager logic 110 and the communication manager logic 150 may reside internal to the security agent 180. Additionally, the security agent 180 may communicate information related to perceived threats by the network 120 to clients (e.g., supplicant endpoint 130) that connect via the security agent 180 to the network 120. See FIG. 5 for an example showing a supplicant connecting to a network through a security agent 530. The security agent 180 may communicate the status changes of the network 120 either by pushing the information to the clients or by sending the information at the request of the clients (e.g., pulling information from the security agent). Note that supplicants control access to networks. In one example, a security agent may be a layer above the supplicant and provide additional access control. In another example, a security agent may be an application that makes use of the supplicant. Thus, a security agent may receive information and set information in a communication manager, which could in turn push or pull information to other agents, applications, and/or supplicants.

In one embodiment, a supplicant endpoint 130 may be a software application installed on the computer of an end user, a computer seeking access to a network, a client seeking access to a server, and so on. In one embodiment, the communication manager logic 150 is to communicate the network identity 160 and the DALC 140 related to the network identity 160 on the request of the second supplicant endpoint 170, the security agent 180, and so on. "User", as used herein, includes but is not limited to one or more persons, software, computers or other devices, or combinations of these.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Figure 2:
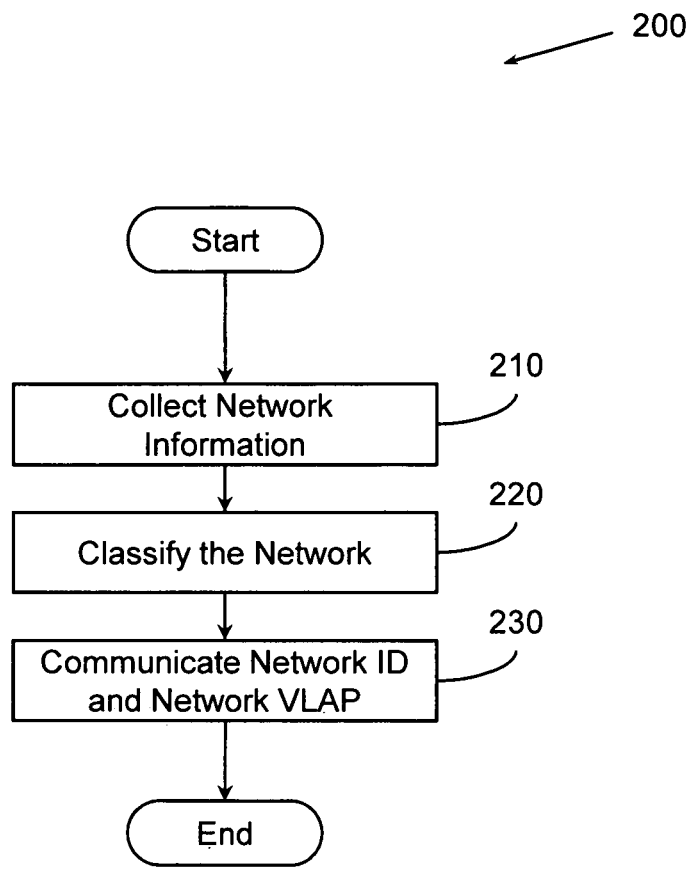
FIG. 2 illustrates an example method associated with supplicant access control.

FIG. 2 illustrates a method 200 associated with supplicant access control. Method 200 may include, at 210, collecting network information. The network information may be associated with a network to which an endpoint is to be communicatively coupled. The network information may include a network identification and information to facilitate the evaluation of network threats. Information to evaluate threats may include a network traffic level, a protocol level, a network traffic type, and so on.

Method 200 may also include, at 220, classifying the network. The network may be classified at 220 based, at least in part, on the network information. The classification may assign a variable level access parameter (VLAP) to the network. The VLAP may include three or more access levels for the network at the endpoint. In one embodiment, collecting the network information at 210 includes collecting an extensible authentication protocol (EAP) channel and service information through channel binding parameters, collecting a network access authentication exchange, collecting an IEEE 802.1 network service access point (NSAP) or IEEE 802.1X-REV Network Identifier (NID) advertisement message, and so on.

In one embodiment, the VLAP is based, at least in part, on threats and risks associated with the network to which the supplicant endpoint is to be communicatively coupled. The VLAP facilitates different classes of service available to the network from the supplicant endpoint based on the level of trust assigned to the network.

Method 200 may also include, at 230, communicating the network identification (ID) and the network VLAP. The network identification and the network VLAP may be communicated at 230 to a second endpoint, a security agent, a security application, and so on. A second endpoint receiving the network ID and the network VLAP may facilitate sharing of authentication and authorization information between endpoints (e.g., between supplicants). The security agent may be a firewall that selectively allows a network to access other agents and applications on the endpoint. The level of access to the endpoint may be based on the VLAP.

In one embodiment, communicating the network identification and the network VLAP to the security agent facilitates the security agent authenticating the network and authorizing the network to access the endpoint. In one embodiment, communicating the network identification and the network VLAP is performed at the request of the second endpoint, a third endpoint, the security agent, the security applicant, and so on.

In one embodiment, communicating the network identification and the network VLAP to the second endpoint at 230 facilitates sharing information between the endpoint and the second endpoint. The method 200 may be performed in the endpoint. One skilled in the art will realize that method 200 may also be performed independently of endpoints. For example, method 200 may be performed as a communication and/or policy manager between endpoints (e.g., supplicants) and other clients (e.g., supplicants and security agents) in an 802.1X port based network access control environment.

While FIG. 2 illustrates various actions occurring in serial, it is to be appreciated that various actions illustrated in FIG. 2 could occur substantially in parallel. By way of illustration, a first process could collect network information at 210, a second process could classify a network at 220 based, at least in part, on the network information, and a third process could communicate a network identification and a variable level access parameter (VLAP) at 230. While three processes are described, it is to be appreciated that a greater and/or lesser number of processes could be employed and that lightweight processes, regular processes, threads, and other approaches could be employed.

In one example, executable instructions associated with performing a method may embodied as a logic encoded in one or more tangible media for execution. When executed, the instructions may perform a method. Thus, in one example, a logic encoded in one or more tangible media may store computer executable instructions that if executed by a machine (e.g., processor) cause the machine to perform method 200. While executable instructions associated with the above method are described as being embodied as a logic encoded in one or more tangible media, it is to be appreciated that executable instructions associated with other example methods described herein may also be stored on a tangible media.

A "tangible media", as used herein, refers to a medium that stores signals, instructions and/or data. A tangible media may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a tangible media may include, but are not limited to, a floppy disk, a flexible disk, a hard disk, a magnetic tape, other magnetic medium, an application specific integrated circuit (ASIC), a compact disk CD, other optical medium, a random access memory (RAM), a read only memory (ROM), a memory chip or card, a memory stick, and other media from which a computer, a processor or other electronic device can read.

"Signal", as used herein, includes but is not limited to, electrical signals, optical signals, analog signals, digital signals, data, computer instructions, processor instructions, messages, a bit, a bit stream, or other means that can be received, transmitted and/or detected.

"Software", as used herein, includes but is not limited to, one or more executable instruction that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

Figure 3:
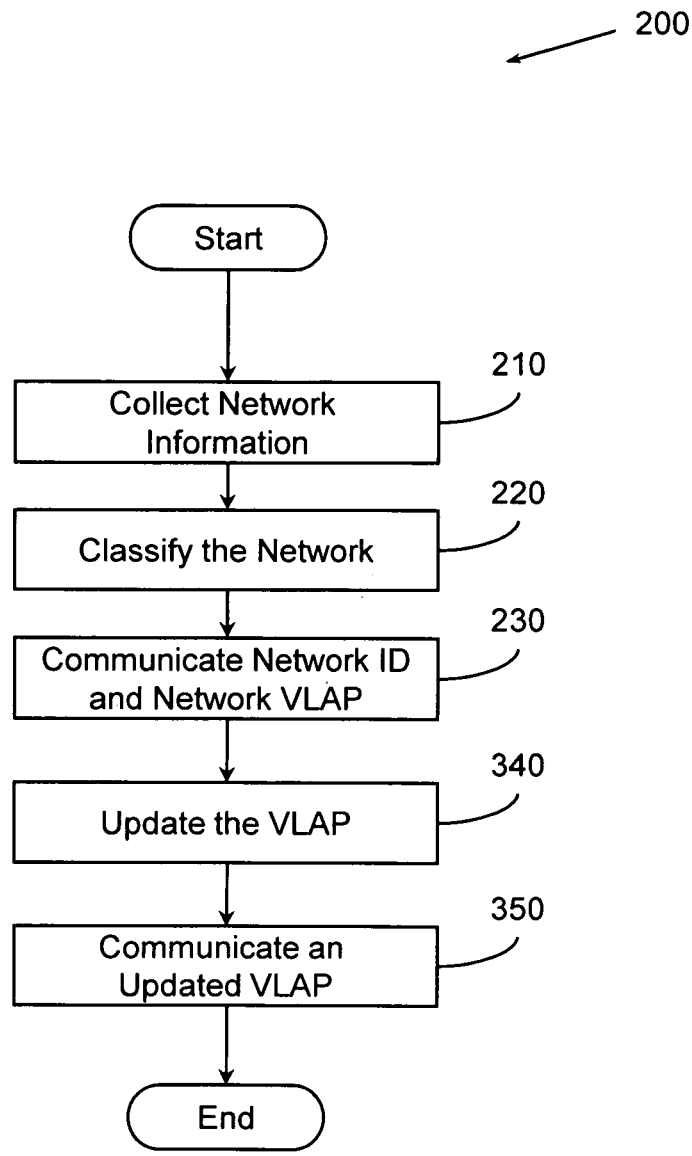
FIG. 3 illustrates another example method associated with supplicant access control.

FIG. 3 illustrates another embodiment of method 200 associated with supplicant access control. This embodiment of method 200 may also include, at 340, updating the VLAP. The VLAP may be updated at 340 based, at least in part, on a change of status of the network, a change of the information associated with the network, a traffic level of the network, a traffic type of the network, a protocol level of the network, and so on.

The embodiment of method 200 as seen in FIG. 3 may also include, at 350, communicating an updated VLAP. The VLAP may be updated to become the updated VLAP to reflect changes in the network, in an 802.1X port based network access control environment, and so on. The update may also be due to a perceived change in threat level of the network. The change in the perceived threat level may be due to a change in status of the network, a change in the network traffic type, a change in the network traffic level, a change in the network protocol level, and so on. The updated VLAP may be communicated at 350 to the second endpoint, a third endpoint, the security agent, the security application, and so on. Communication to the third endpoint may share information related to authentication and authorization between endpoints.

Figure 4:
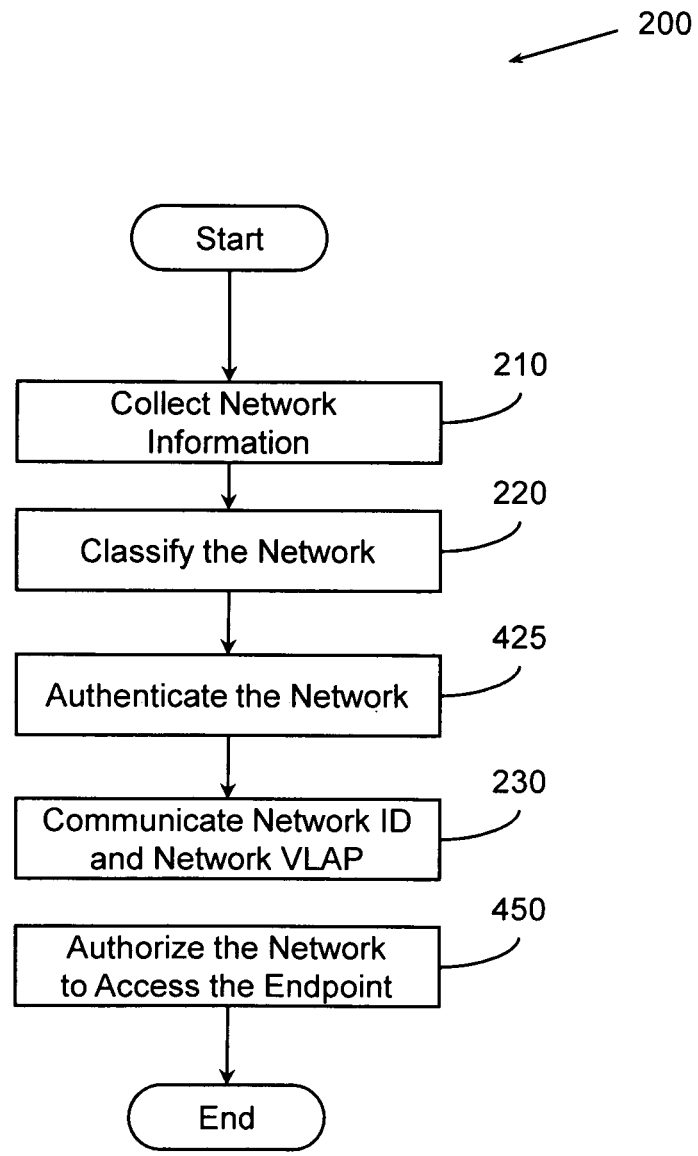
FIG. 4 illustrates another example method associated with supplicant access control.

FIG. 4 illustrates another embodiment of method 200 associated with supplicant access control. This embodiment of method 200 may also include, at 425, authenticating the network. The network may be authenticated at 425 based, at least in part, on the network identification. Authentication may be how a service requester (e.g., the network requesting access to the endpoint) is identified to a security application and/or security system. Additionally, authentication may include verifying the identification of the service requester through a secure process, for example, exchange of an encrypted password and/or exchange of a digital signature.

The embodiment of method 200 as seen in FIG. 4 may also include, at 450, authorizing the network to access the endpoint. Authorizing the network to access the endpoint at 450 may be based, at least in part, on the VLAP. Authorization may include determining the level of access to a secure system (e.g., endpoint) once the service requester (e.g., network) is identified and/or authenticated. Once the service requester is authenticated the VLAP may facilitate authorization of the type and/or level of access granted to the service requester. The VLAP may, for example, grant complete read and write access to the endpoint, allow read access only with no write access to the endpoint, allow read access to limited files to the endpoint, allow viewing of the file structure of the endpoint, bar all access to the endpoint, and so on. This illustrates a VLAP assigning three or more access levels for the network at the endpoint.

Figure 5:
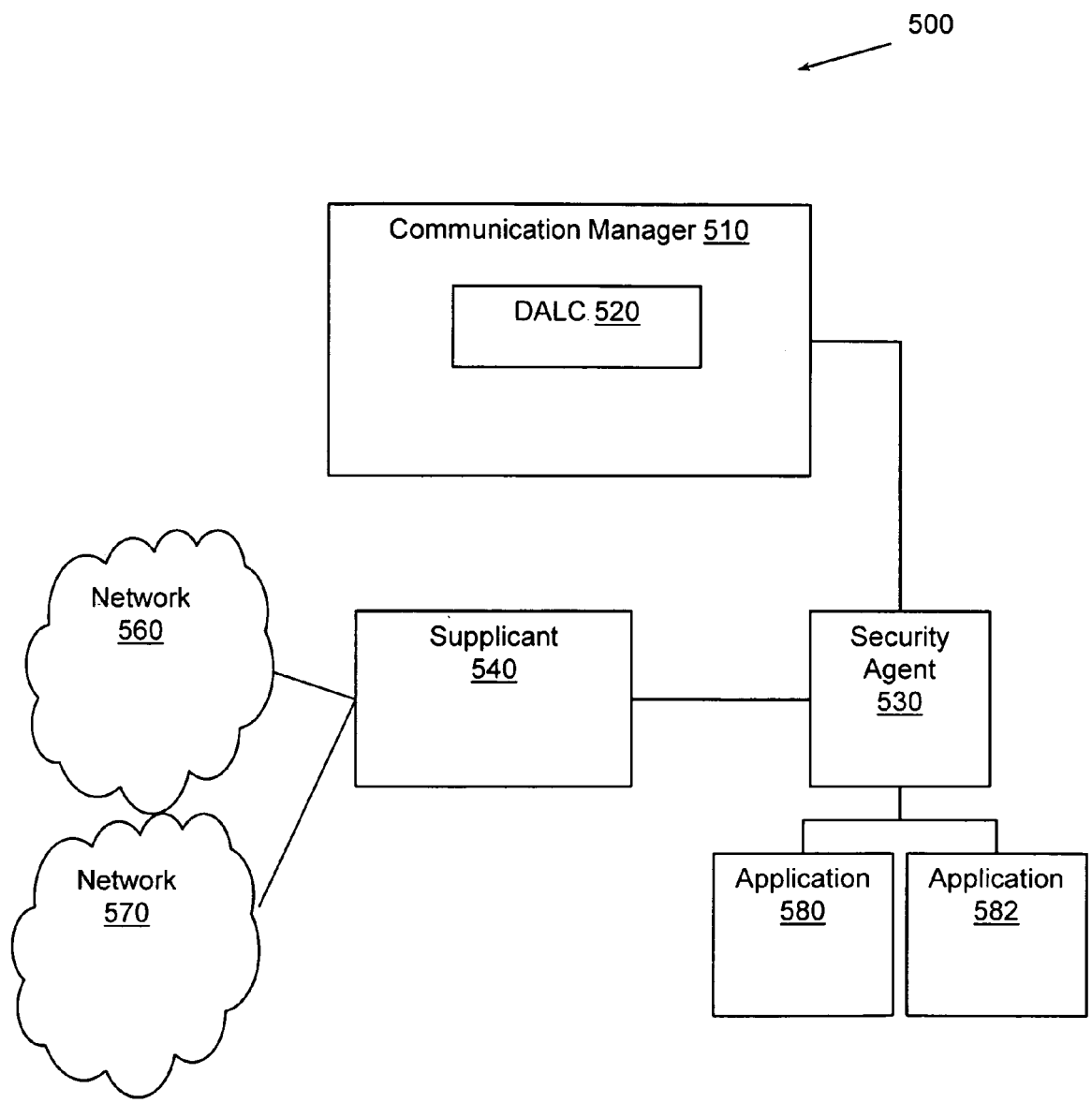
FIG. 5 illustrates an example environment associated with supplicant access control.

FIG. 5 illustrates an example environment 500 associated with supplicant access control. The environment 500 may be a part of an 802.1X port based network access control environment. Environment 500 may include a communication manager 510 that may be associated with the apparatus 100 of FIG. 1. Similarly the communication manager 510 may create a differentiated access level classification (DALC) 520 that may be similar to DALC 140 of FIG. 1. The DALC 520 may facilitate three or more differentiated access levels. These differentiated access levels may facilitate access beyond simple binary access. Simple binary access may be, for example, total access and denial of all access. The communication manager 510 may communicate the DALC 520 to a security agent 530. The security agent 530 may act as a policing agent to control access to a first supplicant 540. The security agent 530 may control access by a network 560 to the supplicant 540 based, at least in part, on the DALC 520. In this example, the security agent 530 is a layer between the supplicant 540 and other applications. Recall that it is the supplicant 540 that controls access to the network.

In one embodiment, the communication manager 510 may also communicate the DALC 520 to the first supplicant 540. In one embodiment, the supplicant 540 may act as its own policing agent to control access by the network based on information from the communication manager 510. One skilled in the art will realize that other components not shown in environment 500 of FIG. 5 may also receive the DALC 520 and/or act as a policing agent.

Additionally, information from other components, the security agent 530, the first supplicant 540, and so on may be shared with the communication manager 510. This information may be data related to perceived threats by the network 560. Information shared with the communication manager 510 may then be shared with supplicant 540, security agent 530, other clients in the environment 500, application 580, application 582, and so on. One skilled in the art will also realize that although the communication manager 510 is shown as being external to the security agent 530 and the supplicant 540, that the communication manager 510 may also be internal to one or more of these components.

Figure 6:
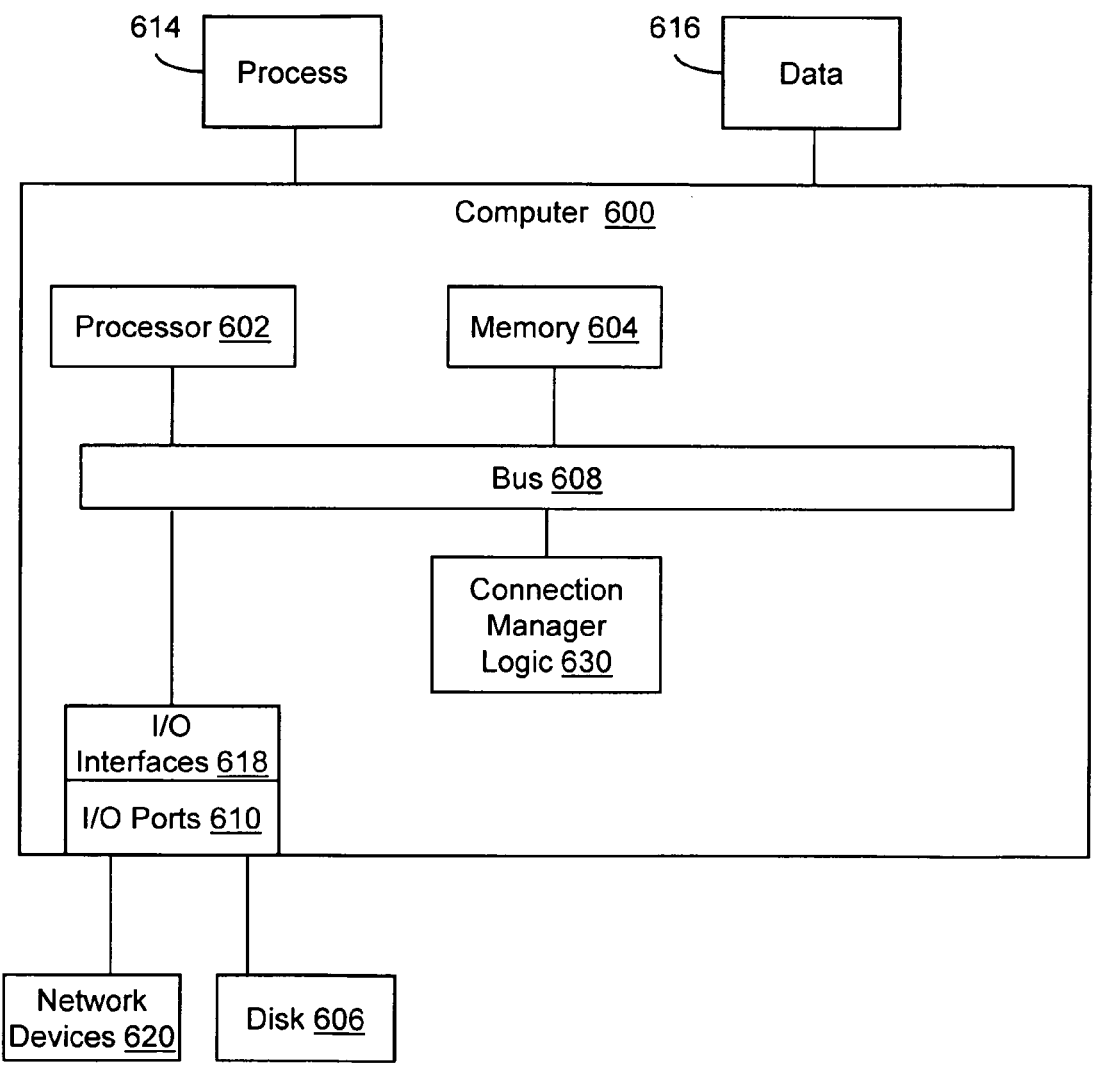
FIG. 6 illustrates an example computing environment in which example systems and methods, and equivalents, may operate.

FIG. 6 illustrates an example computing device in which example systems and methods described herein, and equivalents, may operate. The example computing device may be a computer 600 that includes a processor 602, a memory 604, and input/output ports 610 operably connected by a bus 608. In one example, the computer 600 may include a connection manager logic 630 configured to facilitate supplicant access control. In different examples, the logic 630 may be implemented in hardware, software, firmware, and/or combinations thereof. While the logic 630 is illustrated as a hardware component attached to the bus 608, it is to be appreciated that in one example, the logic 630 could be implemented in the processor 602.

"Hardware component", as used herein, refers to a computer-related entity. Hardware components may include, for example, a process running on a processor, a processor, an object, an executable, and a thread of execution. A hardware component(s) may include a process and/or thread. A hardware component may be localized on one computer and/or may be distributed between multiple computers.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

Logic 630 may provide means (e.g., hardware, software, firmware) for collecting a network information associated with a network to which an endpoint is to be communicatively coupled. The network information may include a network identification and information to facilitate the evaluation of network threats. The means may be implemented, for example, as an ASIC programmed to facilitate supplicant access control. The means may also be implemented as computer executable instructions that are presented to computer 600 as data 616 that are temporarily stored in memory 604 and then executed by processor 602.

Logic 630 may also provide means (e.g., hardware, software, firmware) for classifying the network to create a differentiated access level classification (DALC). The classifying may be based, at least in part, on the network information. The DALC facilitates differential access authorization at the endpoint for the network. The DALC specifies three or more levels of access to be granted to the network. Logic 630 may also provide means (e.g., hardware, software, firmware) for communicating the network identification and the network DALC to a second endpoint, a security agent, a security application, and so on.

Generally describing an example configuration of the computer 600, the processor 602 may be a variety of various processors including dual microprocessor and other multiprocessor architectures. A memory 604 may include volatile memory and/or non-volatile memory. Non-volatile memory may include, for example, ROM, programmable ROM (PROM), and so on. Volatile memory may include, for example, RAM, static RAM (SRAM), dynamic RAM (DRAM), and so on.

A disk 606 may be operably connected to the computer 600 via, for example, an input/output interface (e.g., card, device) 618 and an input/output port 610. The disk 606 may be, for example, a magnetic disk drive, a solid state disk drive, a floppy disk drive, a tape drive, a Zip drive, a flash memory card, a memory stick, and so on. Furthermore, the disk 606 may be a CD-ROM drive, a CD recordable (CD-R) drive, a CD rewriteable (CD-RW) drive, a digital versatile disk and/or digital video disk read only memory (DVD ROM), and so on. The memory 604 can store a process 614 and/or a data 616, for example. The disk 606 and/or the memory 604 can store an operating system that controls and allocates resources of the computer 600.

The bus 608 may be a single internal bus interconnect architecture and/or other bus or mesh architectures. While a single bus is illustrated, it is to be appreciated that the computer 600 may communicate with various devices, logics, and peripherals using other busses (e.g., peripheral component interconnect express (PCIE), 1394, universal serial bus (USB), Ethernet). The bus 608 can be types including, for example, a memory bus, a memory controller, a peripheral bus, an external bus, a crossbar switch, and/or a local bus.

The computer 600 may interact with input/output devices via the i/o interfaces 618 and the input/output ports 610. Input/output devices may be, for example, a keyboard, a microphone, a pointing and selection device, cameras, video cards, displays, the disk 606, the network devices 620, and so on. The input/output ports 610 may include, for example, serial ports, parallel ports, and USB ports.

The computer 600 can operate in a network environment and thus may be connected to the network devices 620 via the i/o interfaces 618, and/or the i/o ports 610. Through the network devices 620, the computer 600 may interact with a network. Through the network, the computer 600 may be logically connected to remote computers. Networks with which the computer 600 may interact include, but are not limited to, a LAN, a WAN, and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. An apparatus, comprising:
    a processor;
    a policy manager logic encoded in one or more non-transitory computer-readable storage media for execution and when executed operable to perform:
        obtaining authenticated network information through a network access authentication exchange attempting to authenticate a network to which a supplicant endpoint is to be communicatively coupled, wherein the authenticated network information comprises a network identification and information to facilitate an evaluation of threats and risks associated with the network;
        classifying the network based at least in part on the obtained authenticated network information, the policy manager logic creating a differentiated access level classification (DALC) and where the DALC specifies three or more levels of access that may be granted to the network;
        wherein the DALC facilitates differentiating access based, at least in part, on threats and risks associated with the network, and wherein the DALC facilitates establishing different classes of service available to the network by the supplicant endpoint; and
    a communication manager logic encoded in the one or more non-transitory computer-readable storage media for execution and when executed operable to perform:
        communicating a network identity and a DALC related to the network identity, where the communication manager logic communicates the network identity and the related DALC to one or more of, a second supplicant endpoint, and a security agent.

2. The apparatus of claim 1, where the policy manager logic is to continuously classify a network to which a supplicant endpoint is communicatively coupled, where the policy manager logic is to change the DALC associated with the network when a perceived threat level of the network changes, and where changing the DALC is based, at least in part, on one or more of, a change of status of the network, a change in the of authorization status granted by the network, a traffic level of the network, a traffic type of the network, and a protocol level of the network.

3. The apparatus of claim 2, where the communication manager logic is to communicate updates of the DALC to one or more of, the second supplicant endpoint, and the security agent.

4. The apparatus of claim 2, where the policy manager logic and the communication manager logic are independent of the supplicant endpoint, and where the policy manager logic is to aggregate the process of continuously classifying networks to which supplicant endpoints are to be communicatively coupled, and where the policy manager logic is one of, configured locally on the supplicant endpoint, and manageable from the network.

5. The apparatus of claim 1, where classes of service correspond to a level of trust assigned to the network.

6. The apparatus of claim 1, where the security agent is one or more of, a local firewall, an external firewall, a security application, and an authentication server.

7. The apparatus of claim 1, where the supplicant endpoint comprises one or more of, a software application installed on a computer of an end user, a computer seeking access to the network, and a client seeking access to a server.

8. The apparatus of claim 1, where the communication manager logic is to communicate the network identity and the DALC related to the network identity in response to a request of one or more of, the second supplicant endpoint, and the security agent.

9. A logic encoded in one or more non-transitory tangible media for execution and comprising one or more sequences of instructions which when executed by one or more processors cause the one or more processors to perform the steps of:
    collecting through a network access authentication exchange attempting to authenticate a network to which an endpoint is to be communicatively coupled, authenticated network information associated with the network, where the authenticated network information comprises a network identification and information to facilitate an evaluation of threats and risks associated with the network;

classifying the network based, at least in part, on the authenticated network information, to assign a variable level access parameter (VLAP) to the network, the VLAP comprising three or more access levels available for the network at the endpoint;

wherein the VLAP is based, at least in part, on the threats and risks associated with the network, and wherein the VLAP facilitates different classes of service available to the network by the endpoint; and communicating the network identification and the VLAP to one or more of, a second endpoint, a security agent, and a security application.

10. The logic of claim 9, further comprising sequences of instructions which when executed cause:

updating the VLAP based, at least in part, on one or more of, a change of status of the network, a change of the authenticated network information associated with the network, a change of authorization status granted by the network, a traffic level of the network, a traffic type of the network, and a protocol level of the network; and communicating an updated VLAP to one or more of, the second endpoint, a third endpoint, the security agent, and the security application.

11. The logic of claim 9, further comprising sequences of instructions which when executed cause:

authenticating the network based, at least in part, on the network identification; and authorizing the network to access the endpoint based, at least in part, on the VLAP.

12. The logic of claim 11, where communicating the network identification and the VLAP to the security agent facilitates the security agent authenticating the network and authorizing the network to access the endpoint.

13. The logic of claim 9, where communicating the network identification and the VLAP is performed in response to a request of one or more of, the second endpoint, a third endpoint, the security agent, and the security application.

14. The logic of claim 9, where collecting the authenticated network information comprises collecting one or more of, an extensible authentication protocol (EAP) channel and service information through channel binding parameters, an IEEE 802.1 network service access point (NSAP) message, and an IEEE 802.1x-REV Network Identifier message.

15. The logic of claim 9, where communicating the network identification and the network VLAP to the second endpoint facilitates sharing information between the endpoint and the second endpoint, the method being performed in the endpoint.

16. The logic of claim 9, where the logic to perform the the steps operates independently of endpoints, and where the logic to perform the steps operates in between the endpoints and communicates the network identification and the VLAP to one or more of, endpoints, and security agents.

17. The logic of claim 16, the steps being performed in one or more of, within the security agent, and in conjunction with the security agent.

18. A method, comprising the computer-implemented steps of:

collecting through a network access authentication exchange attempting to authenticate a network to which an endpoint is to be communicatively coupled, authenticated network information associated with the network, where the authenticated network information comprises a network identification and information to facilitate an evaluation of threats and risks associated with the network;

classifying the network based, at least in part, on the authenticated network information, to assign a variable level access parameter (VLAP) to the network, the VLAP comprising three or more access levels available for the network at the endpoint;

wherein the VLAP is based, at least in part, on the threats and risks associated with the network, and wherein the VLAP facilitates different classes of service available to the network by the endpoint;

communicating the network identification and the VLAP to one or more of, a second endpoint, a security agent, and a security application;

wherein the steps are performed by one or more computing devices.

19. A method as recited in claim 18, further comprising:

updating the VLAP based, at least in part, on one or more of, a change of status of the network, a change of the information associated with the network, a change of authorization status granted by the network, a traffic level of the network, a traffic type of the network, and a protocol level of the network; and communicating an updated VLAP to one or more of, the second endpoint, a third endpoint, the security agent, and the security application.

20. A method as recited in claim 18, further comprising:

authenticating the network based, at least in part, on the network identification; and authorizing the network to access the endpoint based, at least in part, on the VLAP.

21. A method as recited in claim 18, where communicating the network identification and the VLAP is performed in response to a request of one or more of, the second endpoint, a third endpoint, the security agent, and the security application.

22. A method as recited in claim 18, where collecting the authenticated network information comprises collecting one or more of, an extensible authentication protocol (EAP) channel and service information through channel binding parameters, an IEEE 802.1 network service access point (NSAP) message, and an IEEE 802.1x-REV Network Identifier message.

* * * * *